US011442040B2

(12) United States Patent
Shehab et al.

(10) Patent No.: US 11,442,040 B2
(45) Date of Patent: Sep. 13, 2022

(54) APPARATUS AND METHOD FOR ULTRASONIC SHEAR WAVE INSPECTION

(71) Applicant: The Boeing Company, Chicago, IL (US)

(72) Inventors: Kareem Shehab, Seattle, WA (US); Kate Boudreau Summers, Seattle, WA (US); Paul Stanley Rutherford, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 372 days.

(21) Appl. No.: 16/785,019

(22) Filed: Feb. 7, 2020

(65) Prior Publication Data

US 2021/0247362 A1     Aug. 12, 2021

(51) Int. Cl.
*G01N 29/30* (2006.01)
*G01N 29/04* (2006.01)

(52) U.S. Cl.
CPC ........... *G01N 29/043* (2013.01); *G01N 29/30* (2013.01); *G01N 2291/0422* (2013.01); *G01N 2291/2694* (2013.01)

(58) Field of Classification Search
CPC ............... G01N 29/04; G01N 29/30; G01N 2291/0422; G01N 2291/2694; G01N 29/265; G01N 2291/0258; G01N 2291/044; G01N 29/07; G01N 29/11
USPC ........................................................... 73/584
See application file for complete search history.

(56) References Cited

U.S. PATENT DOCUMENTS

| 5,719,337 | A  | * | 2/1998  | Hall ........................ G01H 5/00 73/159 |
| 7,240,556 | B2 |   | 7/2007  | Georgeson |
| 7,520,172 | B2 |   | 4/2009  | Gifford |
| 7,669,477 | B2 |   | 3/2010  | Georgeson |
| 8,914,244 | B2 | * | 12/2014 | Kollgaard ............ G01N 29/043 702/56 |
| 9,976,988 | B2 | * | 5/2018  | Kollgaard ............ G01N 29/043 |

(Continued)

OTHER PUBLICATIONS

XCEL Marketing Solutions, LLC, "Ultrasonic NDT Testing Shear Wave" printed on Nov. 15, 2019 from https://xcelndt.com/ndt-techniques/advanced-ndt-services/ultrasonic-ndt-testing-shear-wave.

(Continued)

*Primary Examiner* — Jacques M Saint Surin
(74) *Attorney, Agent, or Firm* — Ostrager Chong Flaherty & Broitman P.C.

(57) ABSTRACT

A shear wave inspection tool has a housing with a rotatable top removably fixable over a fastener hole in a structure. An aperture is positioned through the rotatable top and operable to couple an ultrasonic transducer such that when rotatable top is rotated, the ultrasonic transducer transmits a shear wave into the structure around the fastener hole inspecting the fastener hole for an anomaly. A shear wave inspection system includes the inspection tool, an ultrasonic transducer, an ultrasonic data instrument operable to acquire data from the ultrasonic transducer, the nature of the received data indicates the presence of an anomaly in the fastener hole. A method for detecting anomalies in a fastener hole includes removably fixing the inspection tool over a fastener hole and rotating the rotatable top such that the ultrasonic transducer transmits a shear wave in a controlled sweep around the fastener hole.

21 Claims, 9 Drawing Sheets

(56) References Cited

U.S. PATENT DOCUMENTS

| | | | | |
|---|---|---|---|---|
| 10,267,771 | B2* | 4/2019 | Tissenier | G01N 29/48 |
| 10,823,703 | B2* | 11/2020 | Kollgaard | G01N 29/0645 |
| 2017/0038341 | A1* | 2/2017 | Pember | G01N 29/0609 |

OTHER PUBLICATIONS

Hopkins, Deborah et al., Localization and characterization of fatigue cracks around fastener holes using spherically focused ultrasonic probes, AIP Conference Proceedings 1806, 090007 (2017); https://doi.org/10.1063/1.4974651, published online: Feb. 16, 2017.

Chiou, Chien-P, et al., "Ultrasonic Detection of Cracks Below Bolts in Aircraft Skins", Review of Progress in Quantitative Nondestructive Evaluation, vol. 10B, Plenum Press, New York, NY 1991.

Harding, Cayt et al., "Automated Ultrasonic Inspection for Crack Detection at F-111 Lower Wing Skin Fastener Holes", 12th A-PCNDT 2006—Asia-Pacific Conference on NDT, Nov. 5-10, 2006, Auckland, New Zealand.

* cited by examiner

APPARATUS AND METHOD FOR ULTRASONIC SHEAR WAVE INSPECTION

TECHNICAL FIELD

This disclosure relates generally to an apparatus and method for inspection of a structure and, more particularly, to an apparatus and method for non-destructive ultrasonic shear wave inspection of a fastener hole within a structure.

BACKGROUND

It is frequently desirable to inspect structures to identify irregularities or imperfections, such as cracks, discontinuities, voids, or porosity, which could adversely affect the performance of the structure. Non-destructive inspection of structures is utilized to thoroughly examine a structure without harming the structure or requiring significant disassembly of the structure. Non-destructive inspection is advantageous for many applications to provide a thorough inspection of the exterior and/or interior of a structure and is preferred to avoid the schedule, labor, and costs associated with removal of a structure or a part of a structure for inspection, as well as avoidance of the potential for damaging the structure. For example, non-destructive inspection is commonly used in the aircraft industry to inspect aircraft structures, such as fastener holes used for fastening aircraft structures together, for any type of internal or external irregularities or imperfection in the structure. Inspection may be performed during manufacturing or after the completed structure has been put into service, including field testing, to validate the integrity and fitness of the structure.

BRIEF DESCRIPTION

The subject matter disclosed in some detail below is directed to a portable shear wave inspection tool that will streamline inspection of fastener holes in a structure, making inspections consistently repeatable with a higher probability of identifying an anomaly in the structure surrounding a fastener hole, thereby increasing inspection speed and efficiency while reducing cost. As used herein, the term "anomaly" represents something that deviates from what is standard, normal, or expected, and includes irregularities or imperfections, such as cracks, discontinuities, voids, or porosity, which could adversely affect the performance of the structure. Use of the term "fastener hole" is not intended to be limiting. The shear wave inspection tool may be used to inspect any type of structural part in various applications where it is desired to perform an inspection around the structural part. The inspection tool may be used for inspecting structures during manufacture or in-service without damaging or disassembling the structures. The inspection tool is removably fixed to a surface of the structure by suction cups, magnets, or like affixation methods such that the inspection tool can be readily moved from one inspection site to another, for example, from one fastener hole to another.

The inspection tool holds a shear wave ultrasonic transducer at a correct location relative to the fastener hole such that it can be moved to scan around the fastener hole in a controlled sweep. The inspection tool has replaceable rotatable tops with different arrangements of apertures for holding the ultrasonic transducer in different locations relative to the center of the replaceable rotatable tops depending on the size of the fastener hole. A fastener need not be removed from the fastener hole to perform the inspection using the shear wave inspection tool. The ultrasonic transducer emits an ultrasonic shear wave signal at an angle less than 90° from its contact surface into the structure as it sweeps around the fastener hole, and shear wave data is reflected back to the ultrasonic transducer for viewing and analysis on an ultrasonic data instrument. When the shear wave signal hits an anomaly in the structure surrounding the fastener hole, the reflected shear wave data shows an amplitude change indicating the anomaly.

In one aspect of the disclosure, a shear wave inspection tool for identifying an anomaly in a structure includes a housing having a rotatable top that is adapted to be removably fixable in a position over a fastener hole in a structure. At least one aperture is positioned off-center and through a horizontal surface of the rotatable top operable to couple an ultrasonic transducer to the rotatable top such that when the rotatable top is rotated, the ultrasonic transducer transmits a shear wave into the structure in a controlled sweep around the fastener hole inspecting the fastener hole for an anomaly. The rotatable top is rotated manually by a user, or the housing can be provided with mechanical, electro-mechanical, or other means to automate and control the rotation. The horizontal surface of the rotatable top may be, but need not be, transparent. An alignment indicator is provided in the rotatable top and operable to orient a center of the rotatable top with a central axis of the fastener hole.

In another aspect of the disclosure, the rotatable top comprises a plurality of apertures through the horizontal surface for selectively coupling the ultrasonic transducer to the rotatable top. The apertures are positioned different distances from a center of the rotatable top to accommodate inspection of fastener holes of different sizes (i.e., diameter and length of the fastener hole, which is dependent on the thicknesses of the structure).

In a further aspect of the disclosure, the rotatable top of the shear wave inspection tool is removable from the housing and replaceable with another rotatable top having a different arrangement of apertures through the horizontal surface. Any number of the replaceable rotatable tops may be provided with different arrangements of apertures to accommodate ready inspection of various size fastener holes, thereby allowing a technician to inspect many different fastener holes of different thicknesses and diameters using the same inspection tool.

In a still further aspect of the disclosure, a shear wave inspection system includes the shear wave inspection tool described above, an ultrasonic transducer, an ultrasonic data instrument operable to acquire shear wave data from the ultrasonic transducer and display the shear wave data from the ultrasonic transducer to determine when there is an anomaly in the structure surrounding the fastener hole. A cable connects the ultrasonic transducer to the ultrasonic data instrument, or a wireless connection may be used, such as a radio-frequency, Bluetooth, or other type of wireless communication protocol.

A method for detecting an anomaly in a fastener hole is also disclosed. In the method, an ultrasonic transducer is inserted into an aperture through a rotatable top of a shear wave inspection tool. In one aspect of the method, the rotatable top has a plurality of apertures positioned at different distances from a center of the rotatable top to accommodate inspection of fastener holes of different sizes. The inspection tool is removably fixed in a position over a fastener hole in a structure such that the ultrasonic transducer contacts an outer surface of the structure. A center of the rotatable top of the inspection tool is aligned with a central axis of the fastener hole. The rotatable top is rotated such that a shear wave emitted from the ultrasonic transducer is transmitted into the structure in a controlled sweep around the fastener hole. The reflected shear wave signal is acquired from the ultrasonic transducer as it is rotated around the fastener hole, and an amplitude and time-of-flight of the reflected shear wave signal is displayed by an ultrasonic data instrument. A change in the amplitude of the reflected shear wave signal indicates an anomaly in the fastener hole. In another aspect of the method, the inspection tool is removed from the structure and removably fixed in a second position above a second hole in the structure. In yet another aspect of the method, the rotatable top is removed from the inspection tool and replaced with a second rotatable top having a different arrangement of the plurality of apertures.

Using the disclosed apparatus and method, structures having a wide range of thicknesses and fastener holes having a wide range of diameters may be inspected quickly, within seconds, with more accuracy and precision in detecting an anomaly, using a single tool, thus saving money and time.

The features, functions, and advantages of the method and product that have been discussed, as well as other objects, features, functions, and advantages of the method and product disclosed herein can be achieved independently in various examples of the disclosure or may be combined in other examples further details of which can be seen with reference to the following description and drawings.

BRIEF DESCRIPTION OF THE DRAWINGS

Various implementations of the disclosure will be hereinafter described with reference to drawings for the purpose of illustrating the above-described and other aspects. None of the drawings briefly described in this section are drawn to scale.

Reference will hereinafter be made to the drawings in which similar elements in different drawings bear the same reference numerals. Where reference is made in any one or more of the accompanying drawings to steps and/or features, which have the same reference numerals, those steps and/or features have, for the purposes of this description, the same function(s) or operators(s), unless the contrary intention is apparent.

DETAILED DESCRIPTION

Illustrative implementations of the disclosed apparatus, system, and method for non-destructive ultrasonic shear wave inspection of a fastener hole within a structure are described in some detail below. Not all features of an actual implementation are described in this specification. A person skilled in the art will appreciate that in the development of any such actual implementation, numerous implementation-specific decisions are made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the following description, the disclosed apparatus, system, and method are described in the context of inspecting fastener holes, such as fastener holes in aircraft wings, as one non-limiting example of an application of the apparatus, system, and method. The apparatus, system, and method can be used to inspect for any type of anomaly in or around a cylindrical bore. The apparatus, system, and method can also readily be used or adapted for use to inspect any number of structures in a variety of industries, such as in the aircraft, automotive, nautical, or construction industries.

Figure 1:
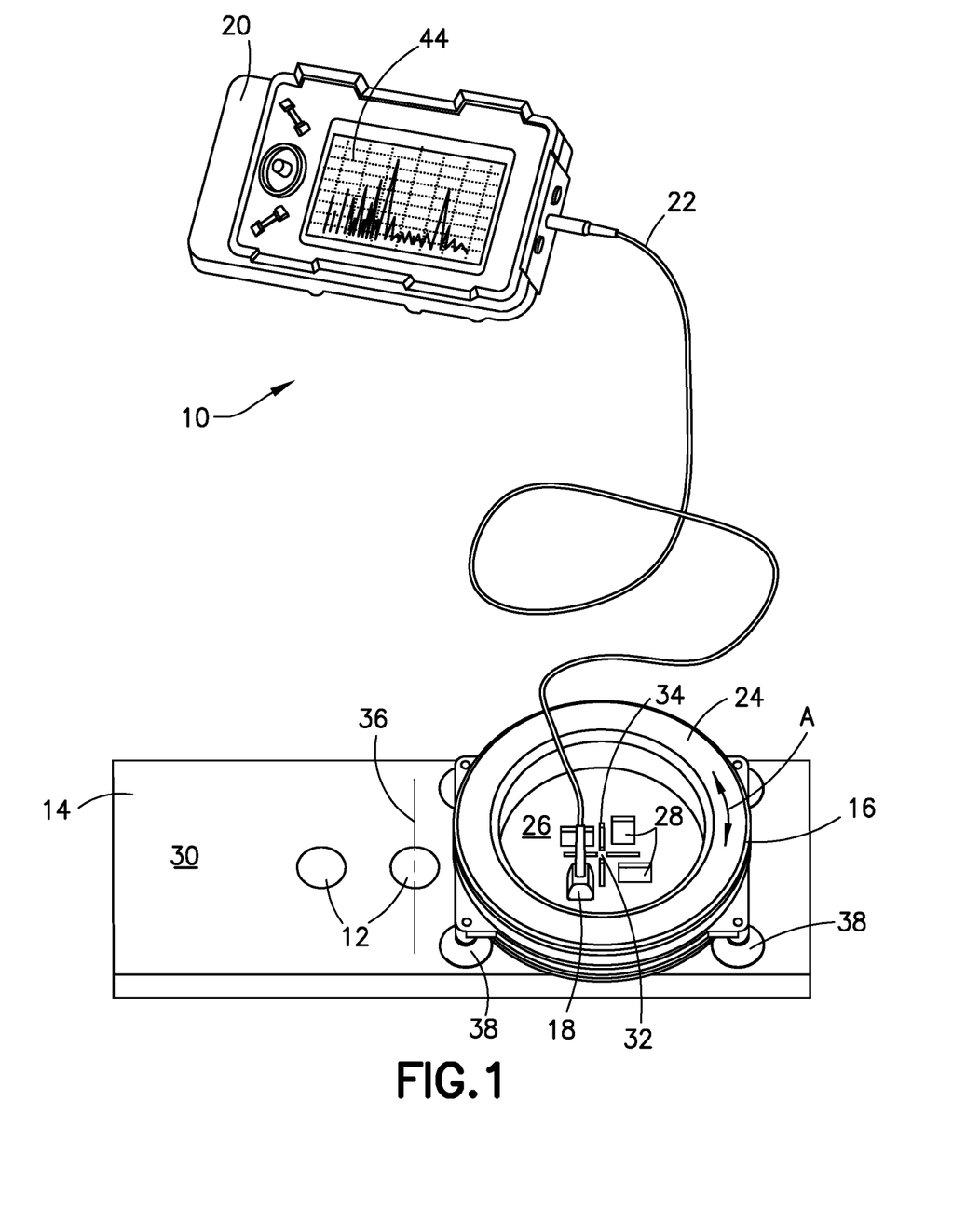
FIG. 1 is an illustration of a shear wave inspection system.

Referring now to the drawings, and in particular to FIG. 1, there is shown a shear wave inspection system 10 for inspecting a fastener hole 12 in a structure 14. The shear wave inspection system 10 includes a shear wave inspection tool 16 removably fixable in a position over the fastener hole 12, an ultrasonic transducer 18, and an ultrasonic data instrument 20 in communication with the ultrasonic transducer 18. A cable 22 connects the ultrasonic transducer 18 to the ultrasonic data instrument 20 to provide the communication therebetween. Alternatively, cable 22 can be replaced by a wireless communication protocol, such as radio-frequency or Bluetooth, to provide the communication between the ultrasonic transducer 18 and the ultrasonic data instrument 20. Any type of ultrasonic transducer that emits a shear wave is suitable for use with the shear wave inspection system 10, such as the shear wave transducers available from Techna NDT, Kent, Wash. Similarly, any type of ultrasonic flaw detectors that are commercially available may be used with the shear wave inspection system 10. Examples include GE USM Go+ Ultrasonic Flaw Detector (USMGO) manufactured by GE Inspection Technologies, Skaneateles, New York, GE Inc.'s Masterscan 380, Sonic 1200 manufactured by Sonatest Inc., and the ultrasonic flaw detectors available from Staveley Instruments, Inc., Kennewick, Wash.

The shear wave inspection tool 16 has a rotatable top 24 with a horizontal surface 26 having one or more apertures 28 through the horizontal surface 26 operable to couple the ultrasonic transducer 18 to the rotatable top 24. The ultrasonic transducer 18 is held in one of the apertures 28 by an interference fit, or other mechanisms may be used to secure the ultrasonic transducer 18 to the horizontal surface 26. The rotatable top 24 and horizontal surface 26 have a circular configuration with a center 32, and both can be rotated together in a clockwise or counterclockwise direction as shown by the arrow A in FIG. 1. The one or more apertures 28 are positioned around the center 32 (i.e., off-center) of the horizontal surface 26. When the horizontal surface 26 includes more than one, or a plurality of apertures 28, the plurality of apertures 28 are positioned at different distances from the center 32 to accommodate inspection of fastener holes 12 having different sizes, i.e., diameter of the fastener hole 12 and thickness of the structure 14 where the fastener hole 12 is located.

Figure 2:
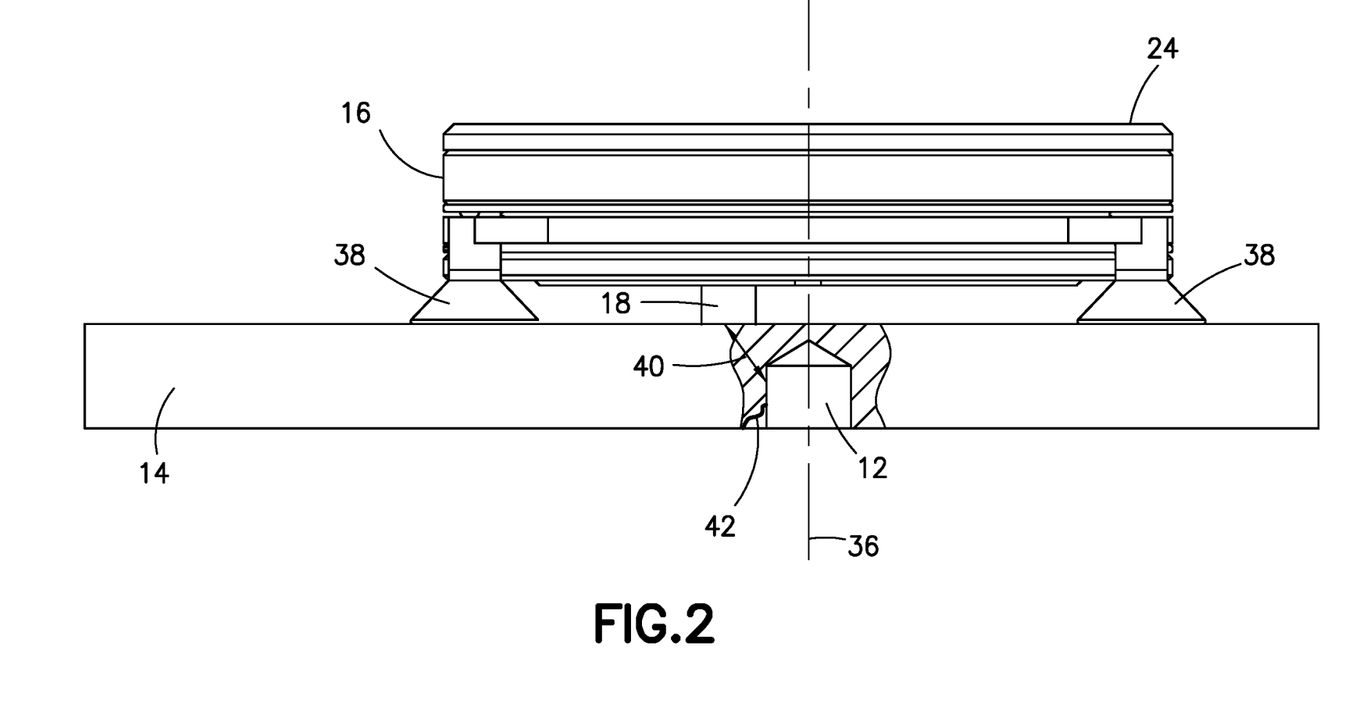
FIG. 2 is a side view of a shear wave inspection tool of the shear wave inspection system removably fixed over a fastener hole in a structure.

The rotatable top also has an alignment indicator 34 operable to orient the center 32 of the rotatable top 24 with a vertical central axis 36 of the fastener hole 12 to be inspected (see side view shown in FIG. 2). The horizontal surface 26 can be, but need not be, made from a transparent material to assist with orienting the center 32 of the rotatable top 24 with the vertical central axis 36 of the fastener hole 12. The alignment indicator 34 includes a plurality of elongated cross-hair markings (if the horizontal surface 26 is transparent) or cuts through the horizontal surface 26 (if the horizontal surface 26 is opaque or transparent), or they can include a clear material placed into the cuts. The elongated markings or cuts are not cut through the center 32 of the horizontal surface 26. Alternatively, or in addition to the elongated cross-hair markings, the alignment indicator may include one or more circular markings or cut-outs center with centers that align with the center 32 of the horizontal surface 26 to assist with orienting the shear wave inspection tool 16 over the fastener hole 12.

The horizontal surface 26 is arranged to be generally parallel to an outer surface 30 of the structure 14 when the shear wave inspection tool 16 is removably fixed to the structure 14. A plurality of suction cups 38 is shown to removably fix the shear wave inspection tool 16 to the structure 14. Any other type of temporary coupling mechanism may be used to keep the shear wave inspection tool 16 in place on the structure 14 while the rotatable top 24 is rotated, such as magnets.

Referring to FIG. 2, when the ultrasonic transducer 18 is installed into the rotatable top 24 and the shear wave inspection tool 16 is removably fixed to the structure 14, a midpoint of the ultrasonic transducer 18 will be aligned at least 0.010 inch outside a circumference of the fastener hole 12. This alignment permits the ultrasonic transducer 18 to rotate in a controlled sweep around the fastener hole 12 while transmitting a shear wave signal 40 within and through the structure 14 to a surface of the fastener hole 12 to inspect the fastener hole 12 for an anomaly 42. When an anomaly 42 is present in the fastener hole 12, the anomaly 42 reflects the shear wave signal 40 back along the same path, or a substantially identical path, to the ultrasonic transducer 18. The reflected shear wave signal 40 returning from the structure 14 is sent to the ultrasonic data instrument 20, which displays an amplitude and time-of-flight of the reflected shear wave signal 40 on a display 44. A change in the amplitude of the reflected shear wave signal 40 indicates an anomaly 42 in the fastener hole 12.

The general location of an anomaly 42 in a fastener hole 12 may be predicted before inspecting the structure 14. For example, small cracks may develop under the skin of a countersunk fastener, normal to a surface of the fastener hole 12, and the cracks are not visible until they extend beyond an edge of the fastener head. The anomaly 42 shown in FIG. 2 is an example of this type of crack. Other types of cracks that may form in or around a fastener hole 12 include porter cracks, through-cracks extending from a top of the fastener hole 12 to a bottom. Thus, referring to FIG. 3, standards 46 having varying thicknesses 48a, 48b, 48c, and 48d, for example, are generally used in the industry to simulate predictable anomalies in simulated bores 50 through the standards 46. Similar to the fastener hole 12, the simulated bores 50 have a cylindrical shape with a vertical central axis 36. The apertures 28 in the horizontal surface 26 of the rotatable top 24 position the ultrasonic transducer 18 in different inspection positions relative to the simulated bores 50 depending on the diameter of the simulated bores 50, the thickness of the standard 46 where the simulated bores 50 are located, and angle of the shear wave signal 40 needed to hit and detect the simulated predictable anomalies in the simulated bores 50. Signal data for the simulated predictable anomalies in the simulated bores 50 is determined and therefore known to the technician when conducting actual inspections. Thus, when the reflected shear wave signal 40 reaches a specific amplitude threshold, the presence of an anomaly 42 is indicated. Since the standards 46 are fixed geometries there is no need for adjustment of the ultrasonic transducer 18 once it is set in the rotatable top 24 of the shear wave inspection tool 16. This allows for faster setup and scan times.

Figure 3:
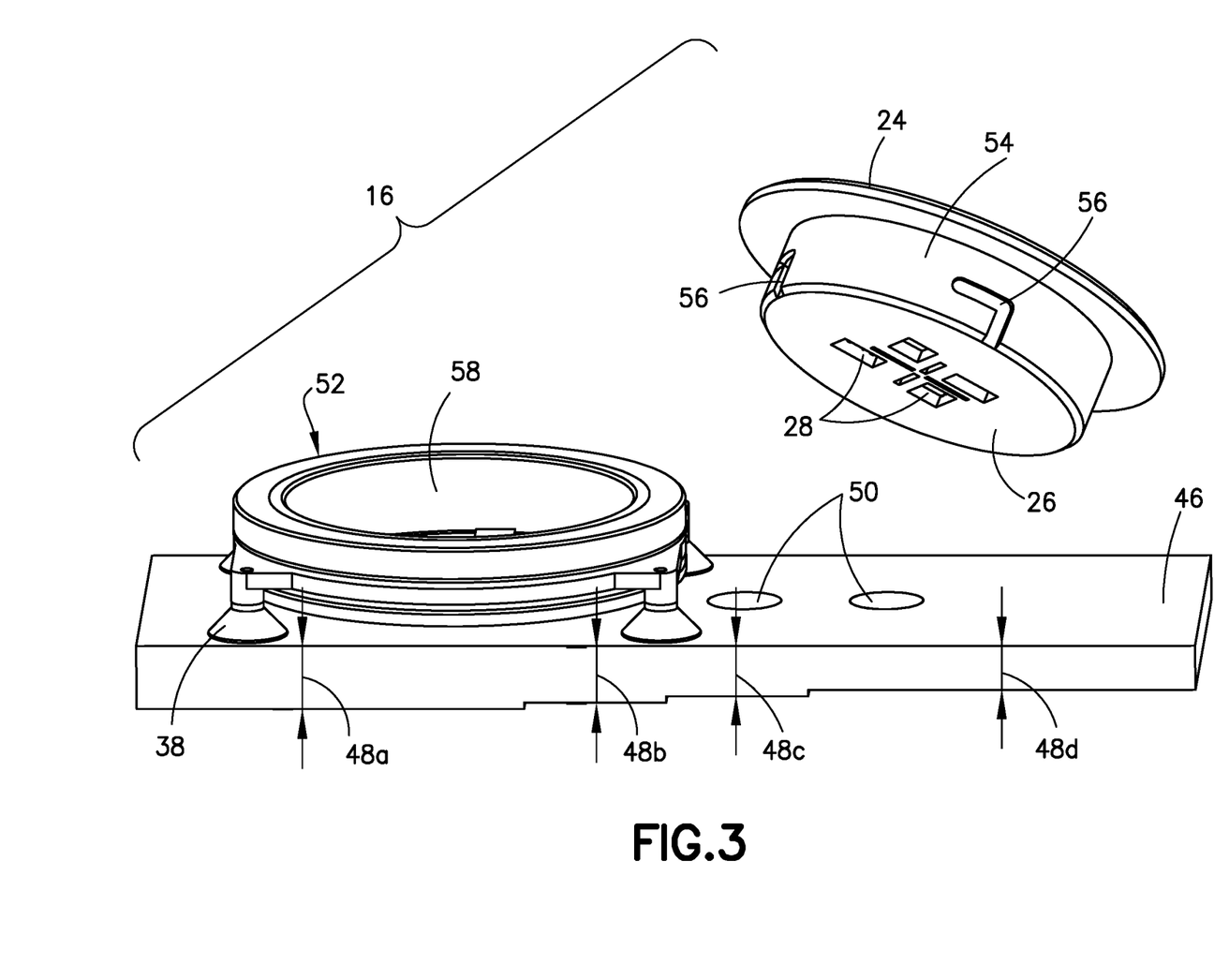
FIG. 3 is an illustration of the shear wave inspection tool with a rotatable top removed from a housing.
Figure 4:
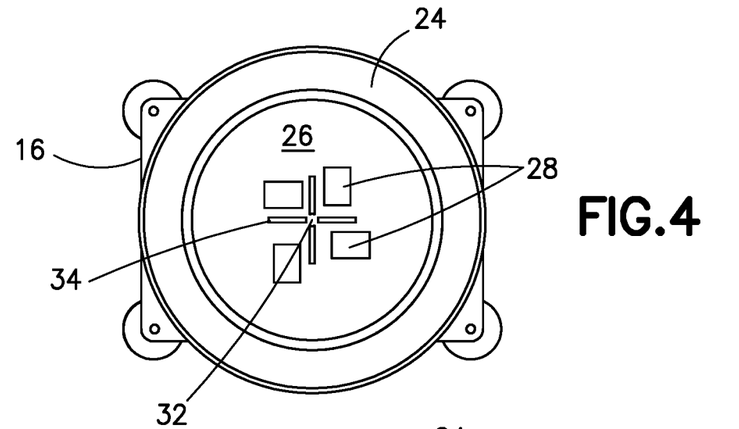
FIG. 4 is a top view of the shear wave inspection tool with a rotatable top having a first arrangement of apertures through the rotatable top.
Figure 5:
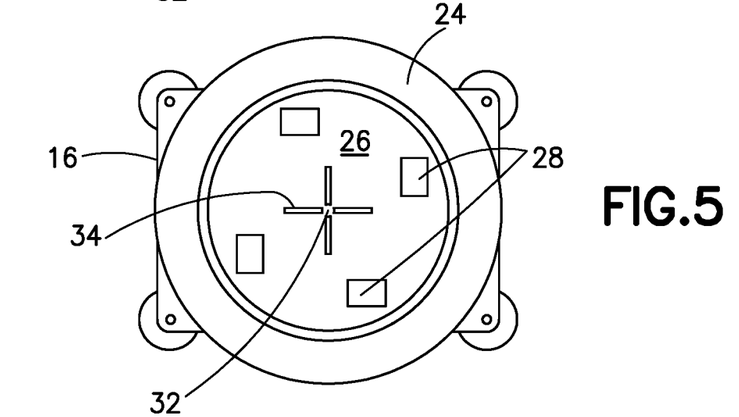
FIG. 5 is a top view of the shear wave inspection tool with a replacement rotatable top having a second arrangement of apertures.
Figure 6:
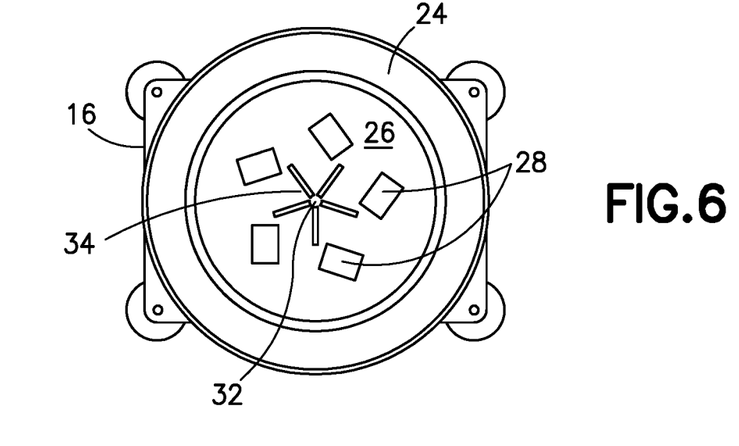
FIG. 6 is a top view of the shear wave inspection tool with another replacement rotatable top having a third arrangement of apertures.

Referring again to FIG. 3, the shear wave inspection tool 16 comprises a housing 52 having the rotatable top 24. The rotatable top 24 is removable from the housing 52 and replaceable with a rotatable top 24 having a different arrangement of the plurality of apertures 28 through the horizontal surface 26. Alternatively, the horizontal surface 26 is removable from the rotatable top 24 and replaceable with another horizontal surface 26 having a different arrangement of the plurality of apertures 28. Examples of different arrangements of the plurality of apertures 28 in the horizontal surface 26 of the rotatable top 24 that may be used for detection of various types of anomalies are shown in FIGS. 4, 5, and 6 for use in inspecting one or more fastener holes 12 having different diameters, thicknesses, and desired angle for the ultrasonic shear wave signal to enter the structure 14. The rotatable top 24 may include a locking mechanism for locking the rotatable top 24 into the housing 52. A locking mechanism is not necessary if there is enough friction between the rotatable top 24 and the housing 52, i.e., an interference fit is sufficient for most purposes. An exemplary locking mechanism is shown in FIG. 3. A side wall 54 of the rotatable top 24 has an L-shaped locking channel 56 that is open at the horizontal surface 26 to accept a locking pin (not shown) that can be positioned on an interior surface 58 of the housing 52 that travels initially upward in the L-shaped locking channel 56 and then horizontally to temporarily lock the rotatable top 24 to the housing 52.

Figure 7:
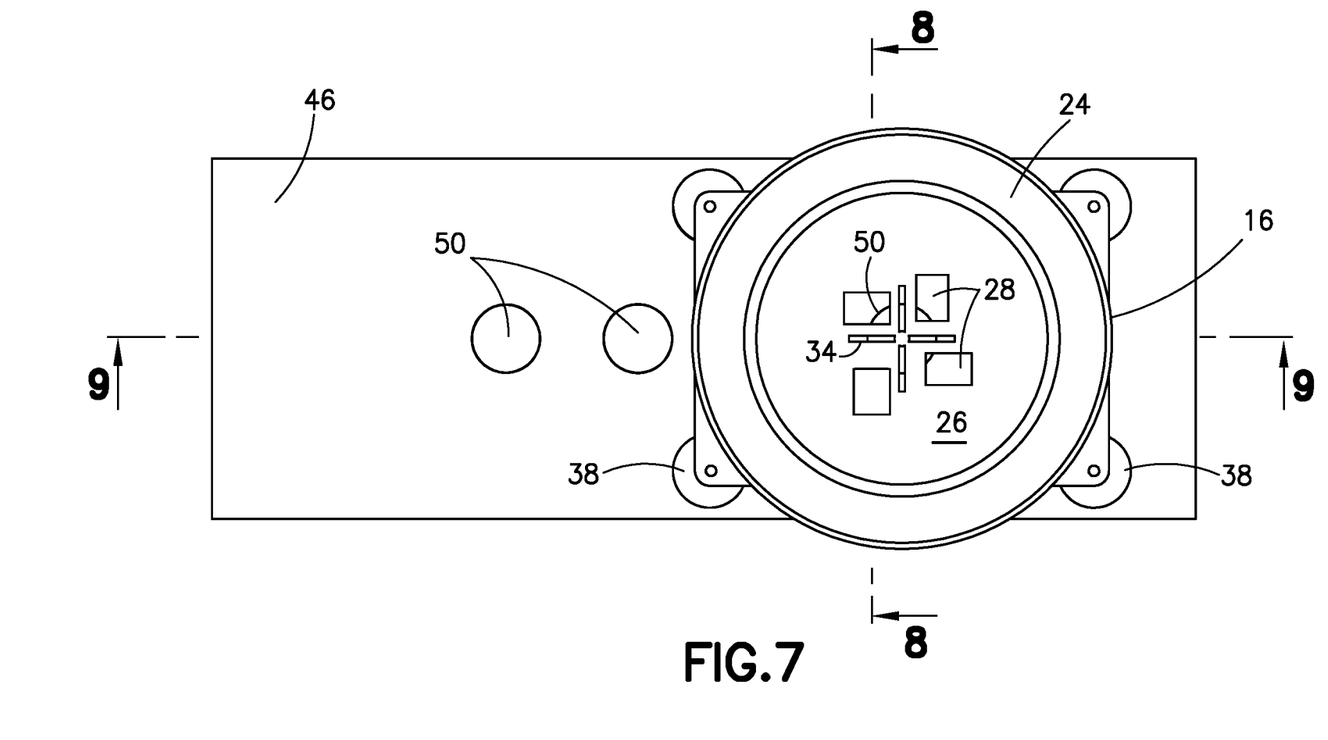
FIG. 7 is a top view of the shear wave inspection tool removably fixed over a fastener hole in a structure.

In FIG. 7, a top view of the shear wave inspection tool 16, the shear wave inspection tool 16 is positioned over one of four simulated bores 50 (three of which are visible) in one of the standards 46 similar to the way the shear wave inspection tool would be positioned over a fastener hole 12 in a structure, such as an aircraft wing. The simulated bores 50 are positioned at different locations where the thickness of the standard is different. Thus, the simulated bores 50 have different thicknesses. In this example, the simulated bores 50 have the same diameter. Four apertures 28 are arranged in the horizontal surface 26 of the rotatable top 24, each in a position to inspect one of the simulated bores 50.

Figure 8:
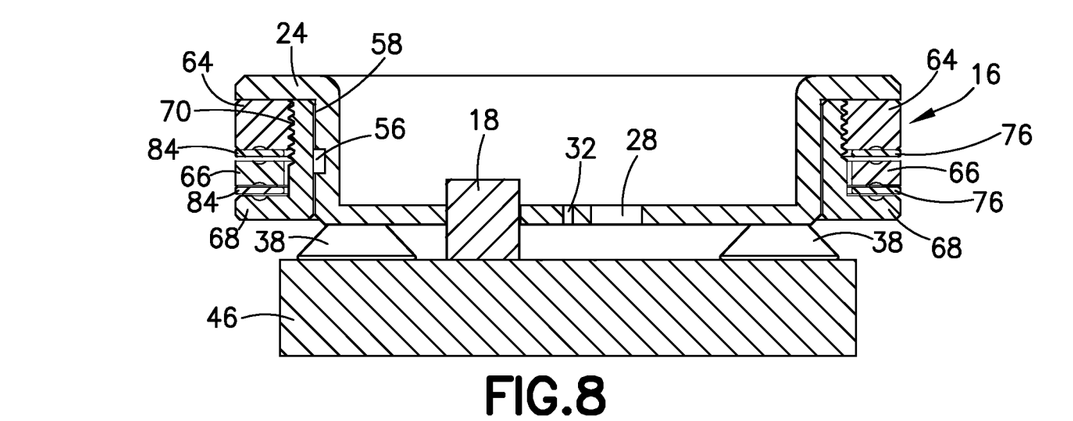
FIG. 8 is a cross-section view of the shear wave inspection tool taken along the lines 8-8 in FIG. 7.
Figure 9:
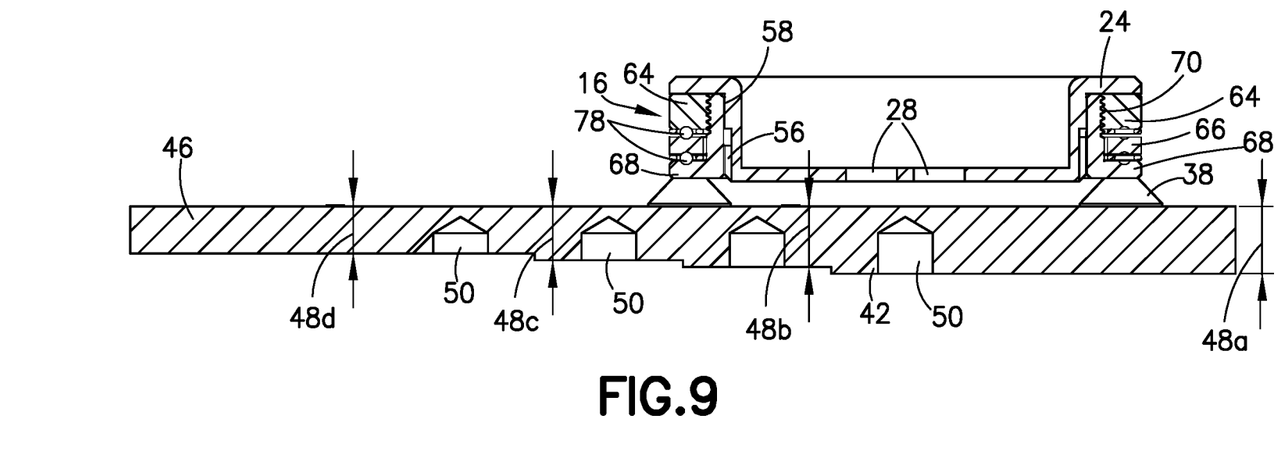
FIG. 9 is a cross-section view of the shear wave inspection tool taken along the lines 9-9 in FIG. 7.
Figure 10:
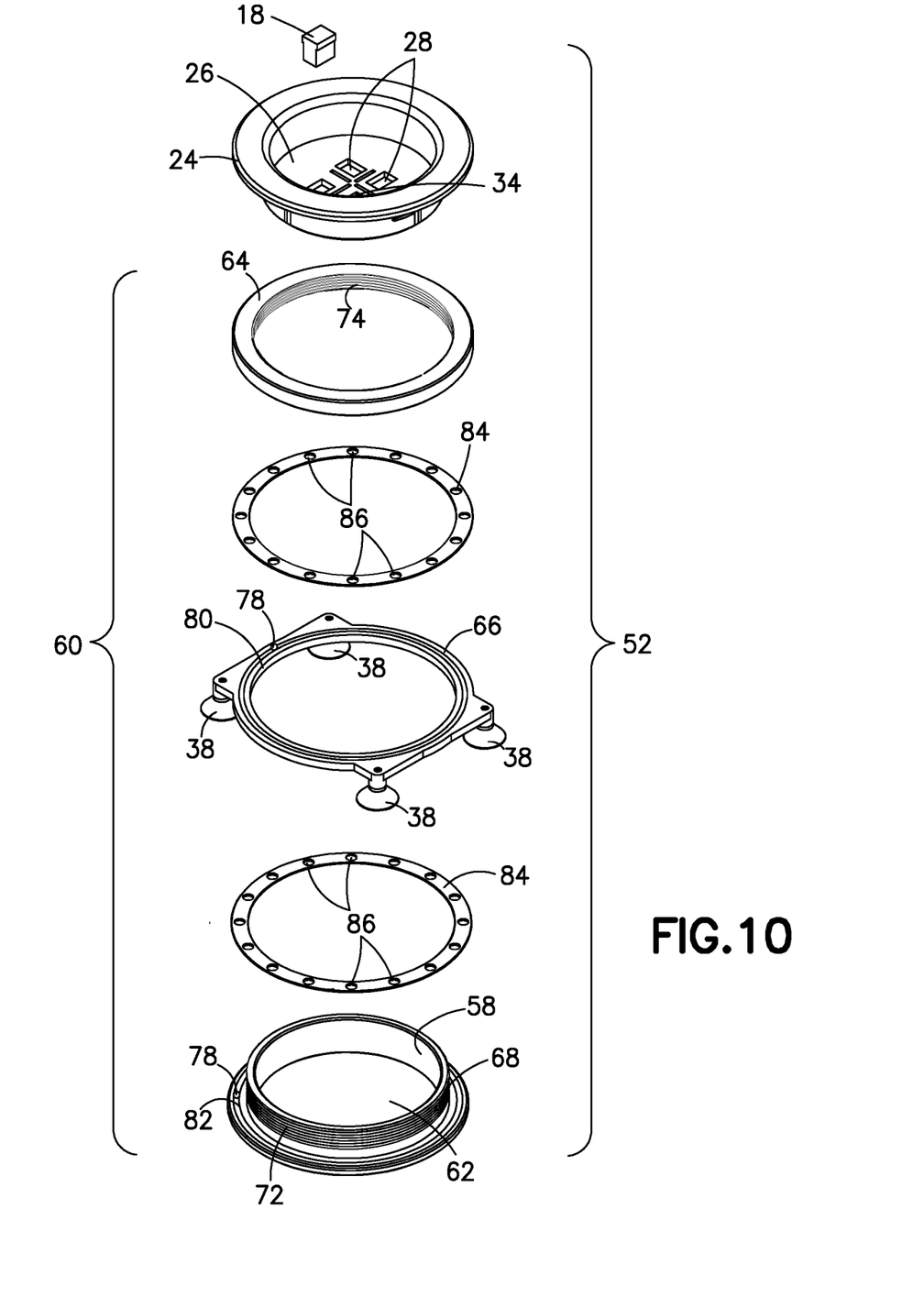
FIG. 10 is an exploded view of the shear wave inspection tool.

The construction of the shear wave inspection tool 16 will be described in more detail with reference to FIGS. 8 and 9, cross-section views, and FIG. 10, an exploded view. As described above, the shear wave inspection tool 16 comprises a housing 52 having a rotatable top 24 that is removable from the rotatable top 24 and replaceable with an alternative rotatable top with a different arrangement of apertures 28 through the horizontal surface 26 of the rotatable top 24. The housing 52 comprises a base assembly 60 that provides a receptacle 62 for the rotatable top 24 to fit within either by interference fit or with a locking mechanism such as the L-shaped locking channel 56 and corresponding pin described above. Thus, the fit between the rotatable top 24 and the receptacle 62 should be strong enough to provide for common rotation of the rotatable top 24 and receptacle 62 together and to permit the rotatable top 24 to be easily removed from the receptacle 62.

The base assembly 60 has an upper portion 64 that is rotatable and has a circular configuration with an open central space that forms a part of the receptacle 62. The rotatable top 24 sits atop and within the open central space of the upper portion 64. The base assembly 60 further comprises an intermediary support structure 66 also having a circular configuration with an open central space operable to support the upper portion 64, a lower portion 68 having a circular configuration with an open central space that forms the interior surface 58 of the receptacle 62 and a bottom of the base assembly 60, and a fastening mechanism 70 (see FIGS. 8 and 9) for fastening the upper portion 64 to the lower portion 68 with the intermediary support structure 66 therebetween. Referring to FIG. 10, the fastening mechanism 70 comprises an exterior screw thread 72 on an exterior surface of lower portion 68 of the base assembly 60 (opposite the interior surface 58 of the receptacle) and an interior screw thread 74 on an inner surface of the upper portion 64. The exterior screw thread 72 passes through the open central space of the intermediary support structure 66 and is engageable with the interior screw thread 74 of the upper portion 64 through the intermediary support structure 66.

At least one rotation mechanism 76 is adapted to provide rotation of the upper portion 64 and the lower portion 68 of the base assembly 60 relative to the intermediary support structure 66. The intermediary support structure 66 has suction cups 38, magnets, or other like affixation methods, to removably fix the intermediary support structure 66, and thus the base assembly 60 of the shear wave inspection tool 16, to a surface of the standards 46 (and the outer surface 30 of a structure 14). Thus, the intermediary support structure 66 does not rotate. The upper portion 64 and the lower portion 68 of the base assembly 60 rotate relative the intermediary support structure 66. Any type of means for rotating parts relative to a stationary part may be used as the rotation mechanism 76.

Here, the rotation mechanism 76 is sandwiched with the intermediary support structure 66 between the upper portion 64 and the lower portion 68 via the fastening mechanism 70. More particularly, the rotation mechanism 76 comprises a plurality of ball bearings 78 that travel in one or two grooved tracks, for example, a first grooved track 80 that surrounds the open central space on an upper surface of the intermediary support structure 66 and in a second grooved track 82 in an upper surface of the lower portion 68 of the base assembly 60. The ball bearings 78 in the first grooved track 80 are sandwiched between a top surface of the intermediary support structure 66 and a bottom surface of the upper portion 64 of the base assembly 60. The ball bearings 78 in the second grooved track 82 are sandwiched between a bottom surface of the intermediary support structure 66 and a top surface of the lower portion 68 of the base assembly 60. Additional grooved tracks may be positioned on a bottom surface of the intermediary support structure 66 underneath the first grooved track 80 for engaging the ball bearings 78 that travel in the second grooved track 82 in the lower portion 68, and on a bottom surface of the upper portion 64 for engaging the ball bearings 78 that travel in the first grooved track 80. Guides 84 having a circular configuration with an open center and a plurality of retainer holes 86 through the guides 84 around the circular configuration are provided to retain the ball bearings 78 in a regular spaced position around the circular configuration of the first grooved track 80 and the second grooved track 82. The fastening mechanism 70 does not have to include the interior screw thread 74 and exterior screw thread 72; any type of fastening mechanism may be used to keep the intermediary support structure 66 and rotation mechanism 76 sandwiched between the upper portion 64 and the lower portion 68 to capture the ball bearings 78 and allow the upper portion 64 and lower portion 68 to rotate or spin freely, thus permitting the rotatable top 24 to rotate or spin freely. For example, ball bearings 78 can be removed and replaced with slick surfaces that freely move across each other, such as a flat plastic surface on another flat plastic surface.

The shear wave inspection system 10 may be used for more time-efficient and cost-efficient inspection of a fastener hole 12 for detection of various types of anomalies that may be found in or around the fastener hole 12. In the disclosed method 100, referring to FIG. 11, first the size of a fastener hole 12 to be inspected is determined (i.e., the diameter and thickness) in step 102. Then, in step 104, the shear wave inspection tool 16 is removably fixed to a standard 46 and centered with the vertical central axis 36 of one of the simulated bores 50 having the same size as the fastener hole 12 to be inspected and a simulated anomaly. In step 106, an ultrasonic transducer 18 is inserted into one of the apertures 28 in the rotatable top 24 of the shear wave inspection tool 16, and the shear wave signal gain and range are calibrated. In step 108, the ultrasonic transducer 18 is turned on if not already on to transmit the shear wave signal 40, and the amplitude and time-of-flight of the reflected shear wave signal 40 is shown on the display 44 of the ultrasonic data instrument 20 to locate the simulated anomaly as the ultrasonic transducer 18 is rotated 360° around the simulated bore 50.

Figures 11, 11A:
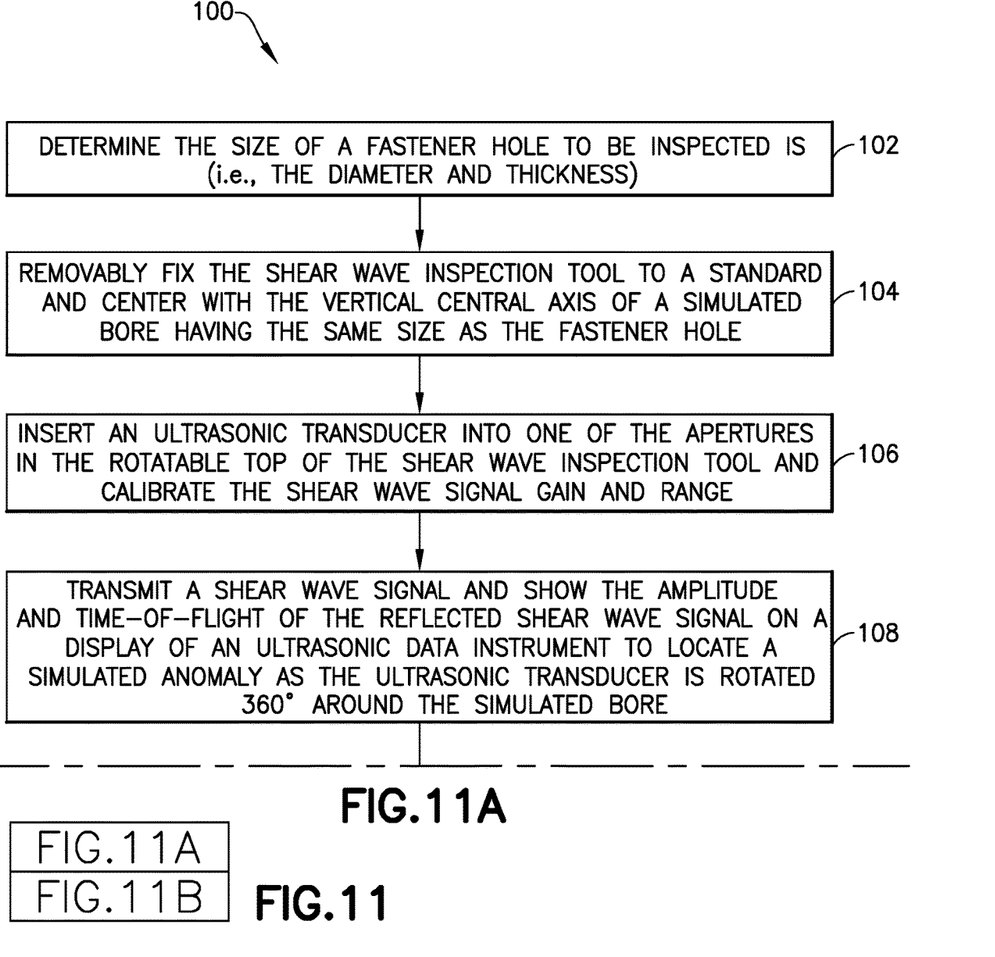
FIG. 11 is a flow chart showing the disclosed methods.
Figure 11B:
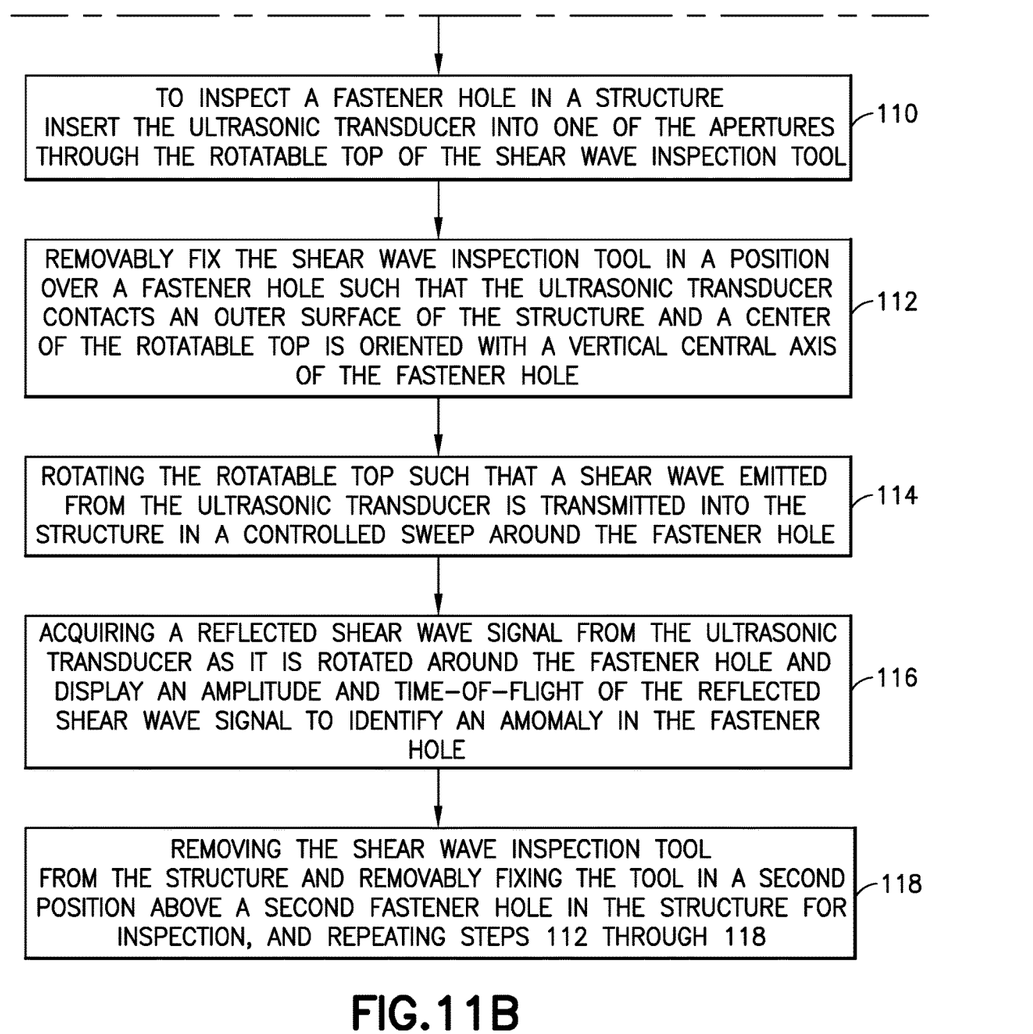

Then, for inspecting a fastener hole 12 in a structure 14, whether in the field or in the manufacturing facility, in step 110, the ultrasonic transducer 18 is inserted into one of the apertures 28 through the rotatable top 24 of the shear wave inspection tool 16. In step 112, the shear wave inspection tool 16 is removably fixed in a position over the fastener hole 12 such that the ultrasonic transducer 18 contacts an outer surface 30 of the structure 14 (like the way it is positioned on a standard 46 as shown in FIG. 8). A center 32 of the rotatable top 24 is oriented with a vertical central axis 36 of the fastener hole 12. In step 114, the rotatable top 24 is rotated such that a shear wave signal 40 emitted from the ultrasonic transducer 18 is transmitted into the structure 14 in a controlled sweep around the fastener hole 12. In step 116, a reflected shear wave signal 40 is acquired from the ultrasonic transducer 18 as it is rotated around the fastener hole 12 and an amplitude and time-of-flight of the reflected shear wave signal 40 are displayed to identify an anomaly 42 in the fastener hole 12 when there is no change in the amplitude of the reflected shear wave signal 40.

In step 118 of the method, the shear wave inspection tool is removed from the structure 14 and removably fixed in a second position above a second fastener hole 12 in the structure 14 for inspection, and steps 112 through 118 are repeated.

In the method, the ultrasonic transducer 18 is coupled with one of the plurality of apertures 28 positioned at different distances from the center 32 of the rotatable top 24 to accommodate inspection of fastener holes 12 of different sizes. When coupled to one of the apertures 28, a midpoint of the ultrasonic transducer 18 is at least 0.010 inch outside a circumference of the fastener hole 12. The method further comprises the step of removing the rotatable top 24 from the shear wave inspection tool 16 and replacing the rotatable top 24 with a second rotatable top having a different arrangement of the plurality of apertures 28, as shown for example in FIGS. 3-6 and described above.

Many modifications of the apparatus, system, and method disclosed herein may occur to those skilled in the art upon reading the specification. The present application includes such modifications. The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which those steps are performed. Nor should the process claims be construed to exclude any portions of two or more steps being performed concurrently or alternatingly unless the claim language explicitly states a condition that precludes such an interpretation.

The invention claimed is:

1. A shear wave inspection tool, comprising:
   a housing having a rotatable top, the housing adapted to be removably fixable in a position over a fastening hole in a structure, the rotatable top being rotatable about an axis that is perpendicular to the structure; and
   an aperture positioned off-center and through a horizontal surface of the rotatable top operable to couple an ultrasonic transducer to the rotatable top such that when the rotatable top is rotated, the ultrasonic transducer transmits a shear wave into the structure around the fastener hole inspecting the fastener hole for an anomaly.

2. The shear wave inspection tool of claim 1, wherein the rotatable top further comprises an alignment indicator operable to orient a center of the rotatable top with a central axis of the fastener hole.

3. The shear wave inspection tool of claim 2, wherein the horizontal surface of the rotatable top is transparent.

4. The shear wave inspection tool of claim 1, wherein the rotatable top comprises a plurality of apertures operable to couple the ultrasonic transducer to the rotatable top, the plurality of apertures positioned at different distances from a center of the rotatable top to accommodate inspection of fastener holes of different sizes.

5. The shear wave inspection tool of claim 4, wherein the rotatable top is removable from the housing.

6. The shear wave inspection tool of claim 4, further comprising a plurality of rotatable tops that are replaceable in the housing, each of the plurality of rotatable tops having a different arrangement of the plurality of apertures through the horizontal surface.

7. The shear wave inspection tool of claim 1, wherein the housing comprises a base assembly that provides a receptacle for the rotatable top, the base assembly having an upper portion that is rotatable.

8. A shear wave inspection tool comprising:
   a housing having a rotatable top, the housing adapted to be removably fixable in a position over a fastening hole in a structure, the housing comprising a base assembly that provides a receptacle for the rotatable top, the base assembly having an upper portion that is rotatable, an intermediary support structure operable to support the upper portion, and at least one rotation mechanism adapted to permit rotation of the upper portion relative to the intermediary support structure; and
   an aperture positioned off-center and through a horizontal surface of the rotatable top operable to couple an ultrasonic transducer to the rotatable top such that when the rotatable top is rotated, the ultrasonic transducer transmits a shear wave into the structure around the fastener hole inspecting the fastener hole for an anomaly.

9. The shear wave inspection tool of claim 8, wherein the base assembly further comprises a lower portion and a fastening mechanism operable to fasten the upper portion to the lower portion with the intermediary support structure, the rotation mechanism sandwiched between the upper portion and the lower portion.

10. The shear wave inspection tool of claim 9, wherein the rotation mechanism comprises ball bearings that travel in a grooved track in the intermediary support structure.

11. The shear wave inspection tool of claim 10, wherein the intermediary support structure comprises two grooved tracks, one on a top surface of the intermediary support structure and another on a bottom surface of the intermediary support structure.

12. The shear wave inspection tool of claim 9, wherein the fastening mechanism comprises an interior screw thread positioned on an inner surface of the upper portion and an exterior screw thread positioned on an outer surface of the lower portion, the interior screw thread engageable with the exterior screw thread through the intermediary support structure.

13. The shear wave inspection tool of claim 8, wherein the intermediary support structure comprises a plurality of suction cups for removably fixing the housing to the structure.

14. A shear wave inspection system, comprising:
   the shear wave inspection tool as recited in claim 1;
   the ultrasonic transducer;
   an ultrasonic data instrument operable to acquire data from the ultrasonic transducer and having a display operable to display the data from the ultrasonic transducer to determine when there is an anomaly in the fastener hole; and
   a cable connecting the ultrasonic transducer to the ultrasonic data instrument.

15. A method for detecting anomalies in fastener holes, comprising:
   inserting an ultrasonic transducer into an aperture through a rotatable top of an inspection tool;
   removably fixing the inspection tool in a position over a fastener hole in a structure such that the ultrasonic transducer contacts an outer surface of the structure to be inspected, proximate the fastener hole and the rotatable top is rotatable about an axis that is perpendicular to the structure; and
   rotating the rotatable top such that a shear wave emitted from the ultrasonic transducer is transmitted into the structure in a controlled sweep around the fastener hole.

16. The method of claim 15, further comprising acquiring a reflected shear wave signal from the ultrasonic transducer and displaying an amplitude and time-of-flight of the reflected shear wave signal as it is rotated around the fastener hole.

17. The method of claim 16, further comprising removing the inspection tool from the structure and removably fixing the inspection tool in a second position above a second hole in the structure.

18. The method of claim 15, further comprising orienting a center of the rotatable top of the inspection tool with a central axis of the fastener hole.

19. The method of claim 15, wherein the ultrasonic transducer is coupled with one of a plurality of apertures positioned at different distances from a center of the rotatable top to accommodate inspection of fastener holes of different sizes.

20. The method of claim 19, wherein the ultrasonic transducer is coupled to one of the plurality of apertures such that a midpoint of the ultrasonic transducer is at least 0.010 inch outside a circumference of the fastener hole.

21. The method of claim 19, further comprising removing the rotatable top from the inspection tool and replacing the rotatable top with a second rotatable top having a different arrangement of the plurality of apertures.

* * * * *